Aug. 11, 1936.  F. X. MALOCSAY  2,050,714
WRAPPING AND BANDING MACHINE
Filed April 7, 1932    12 Sheets-Sheet 6
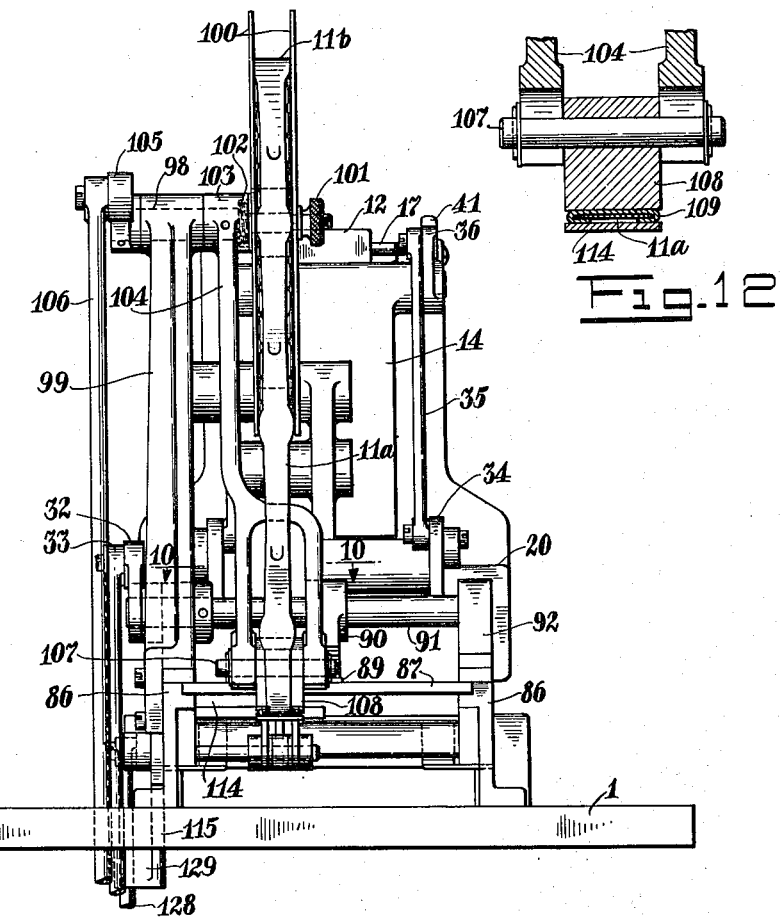
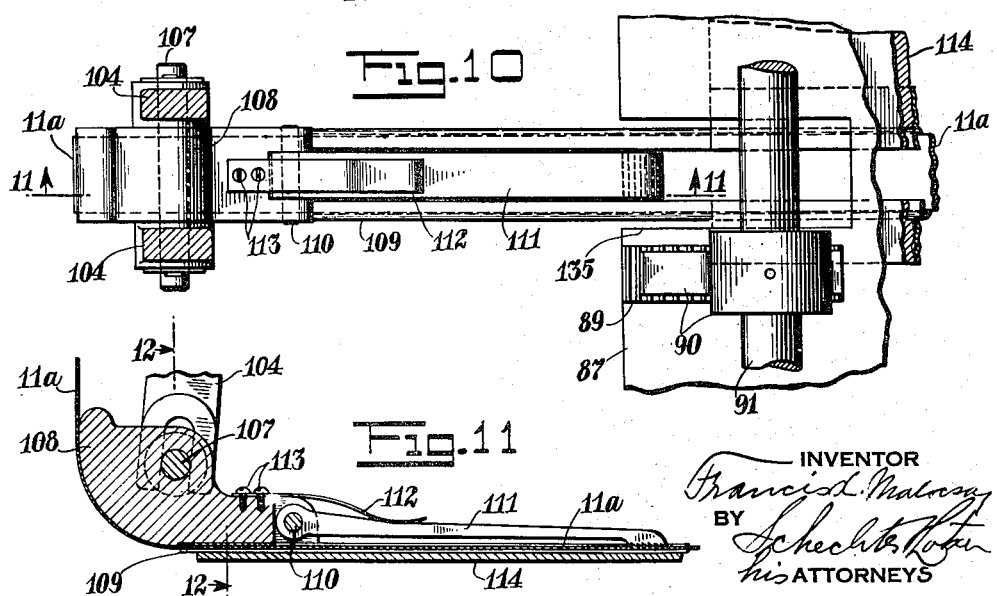

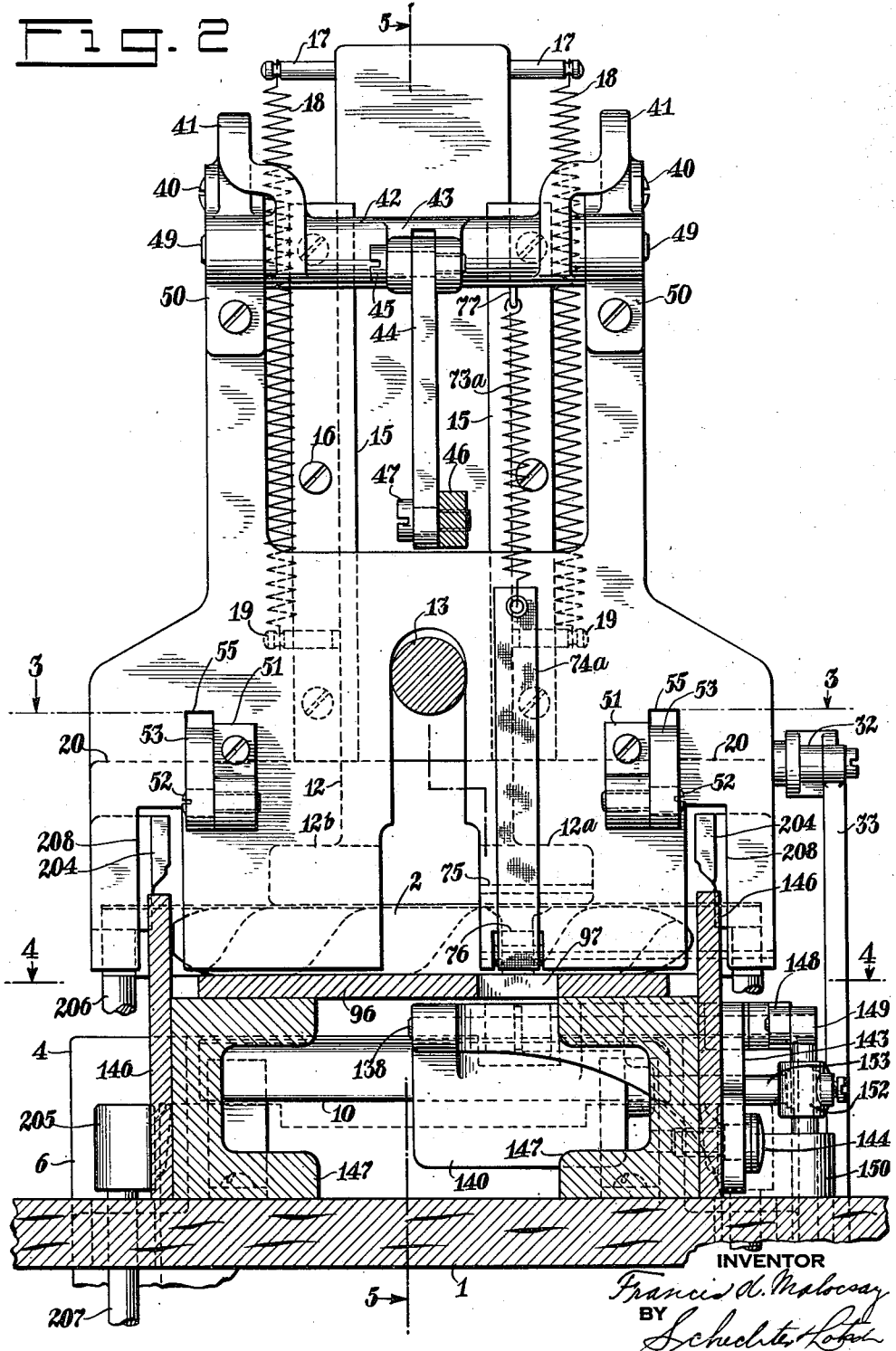

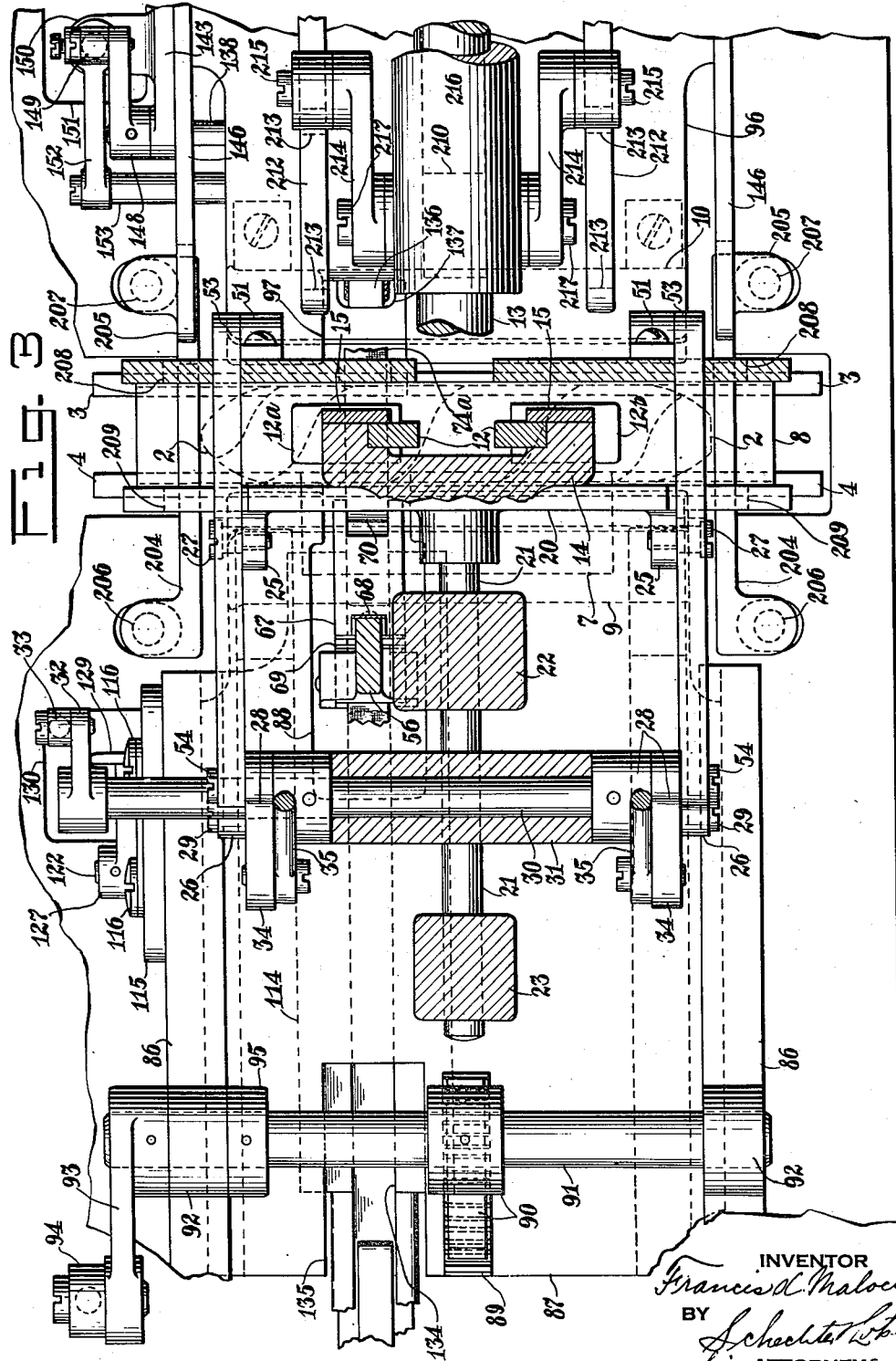

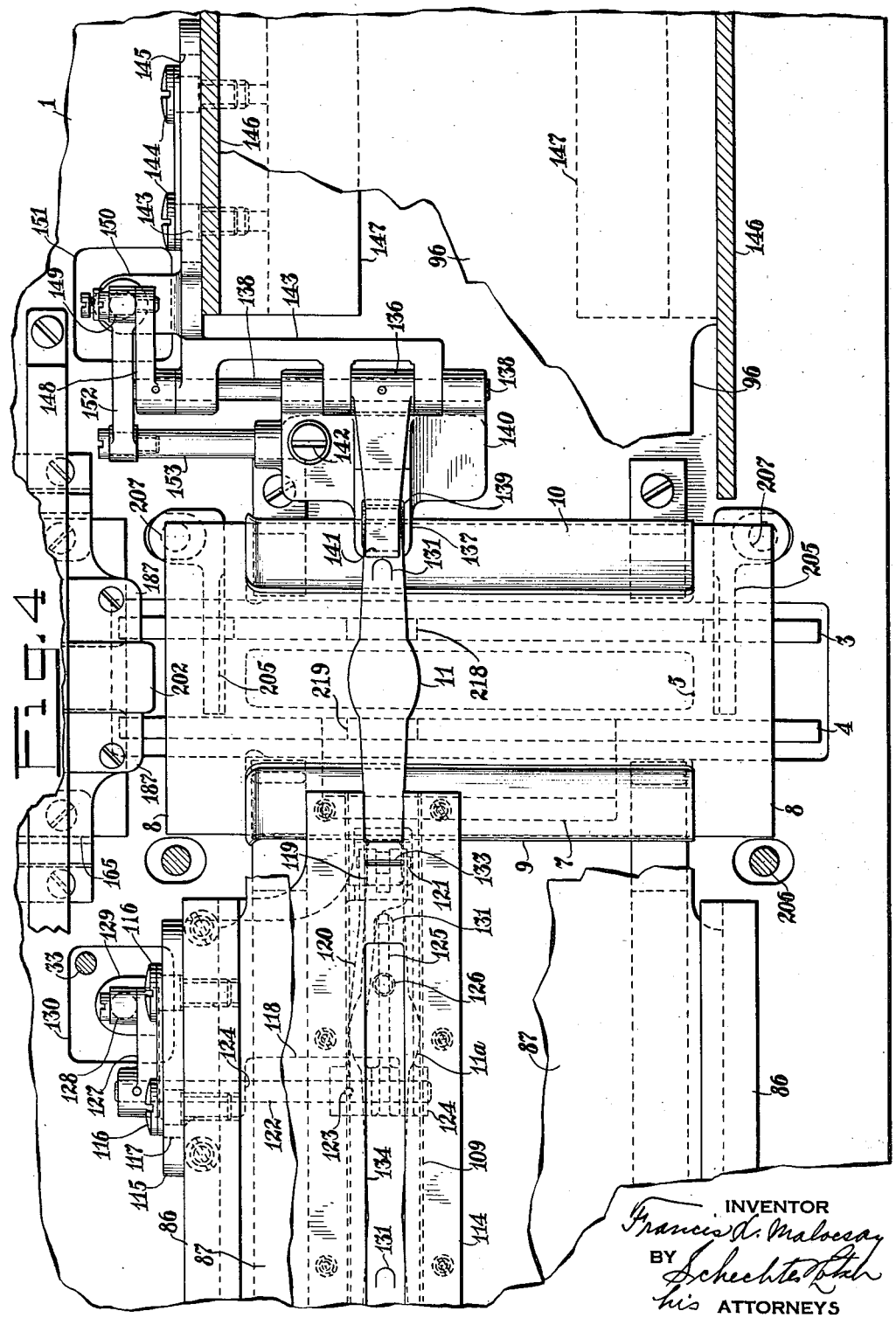

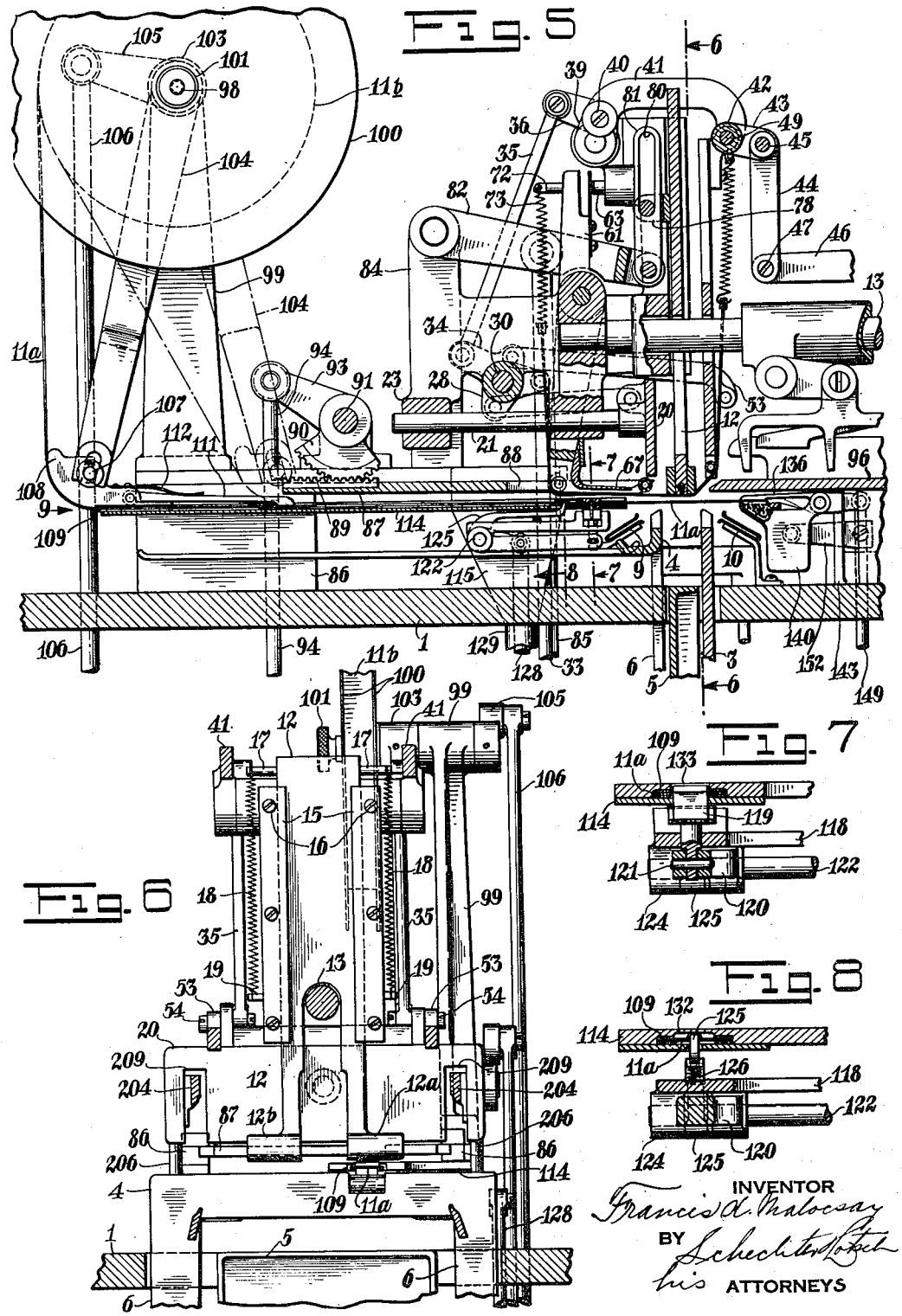

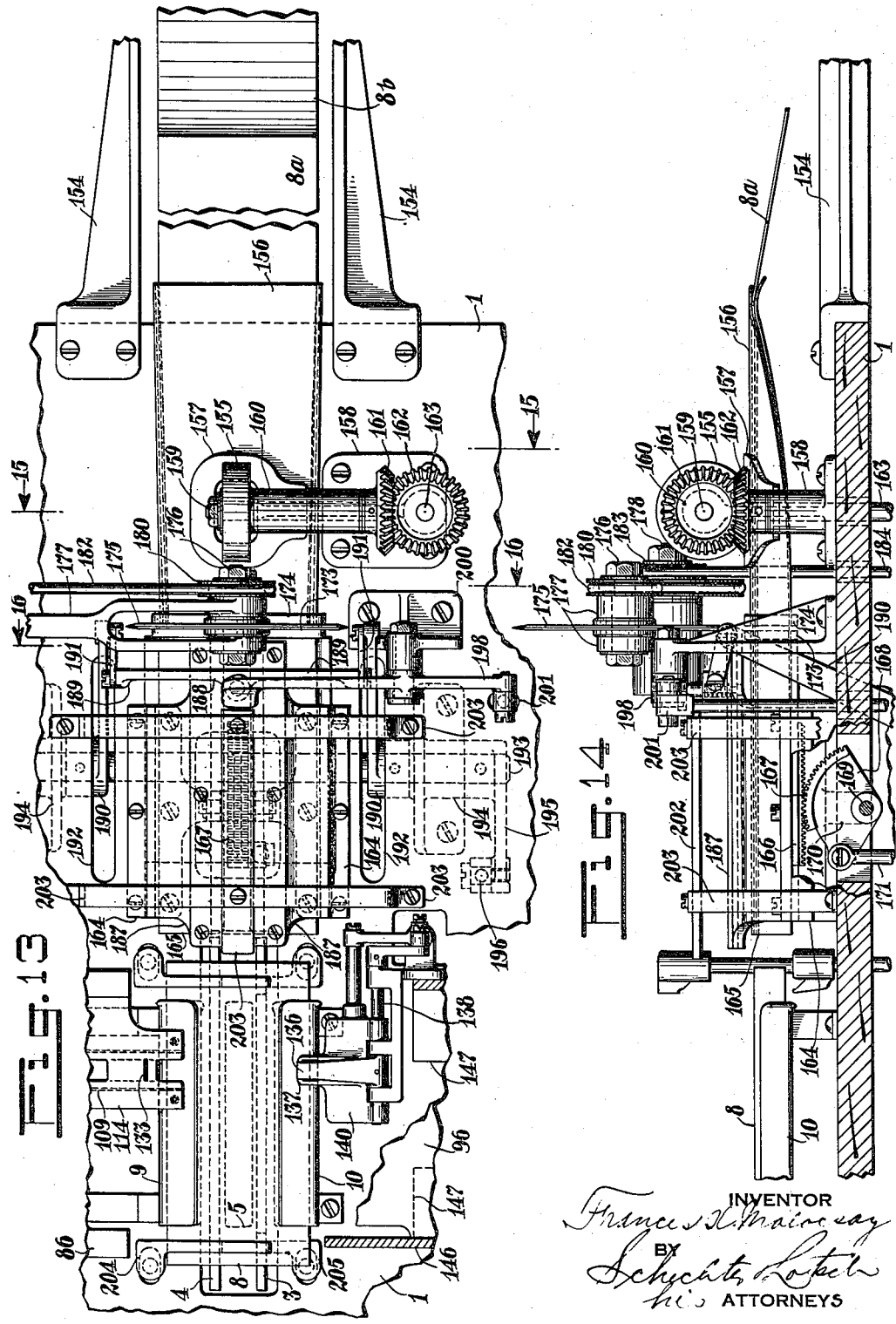

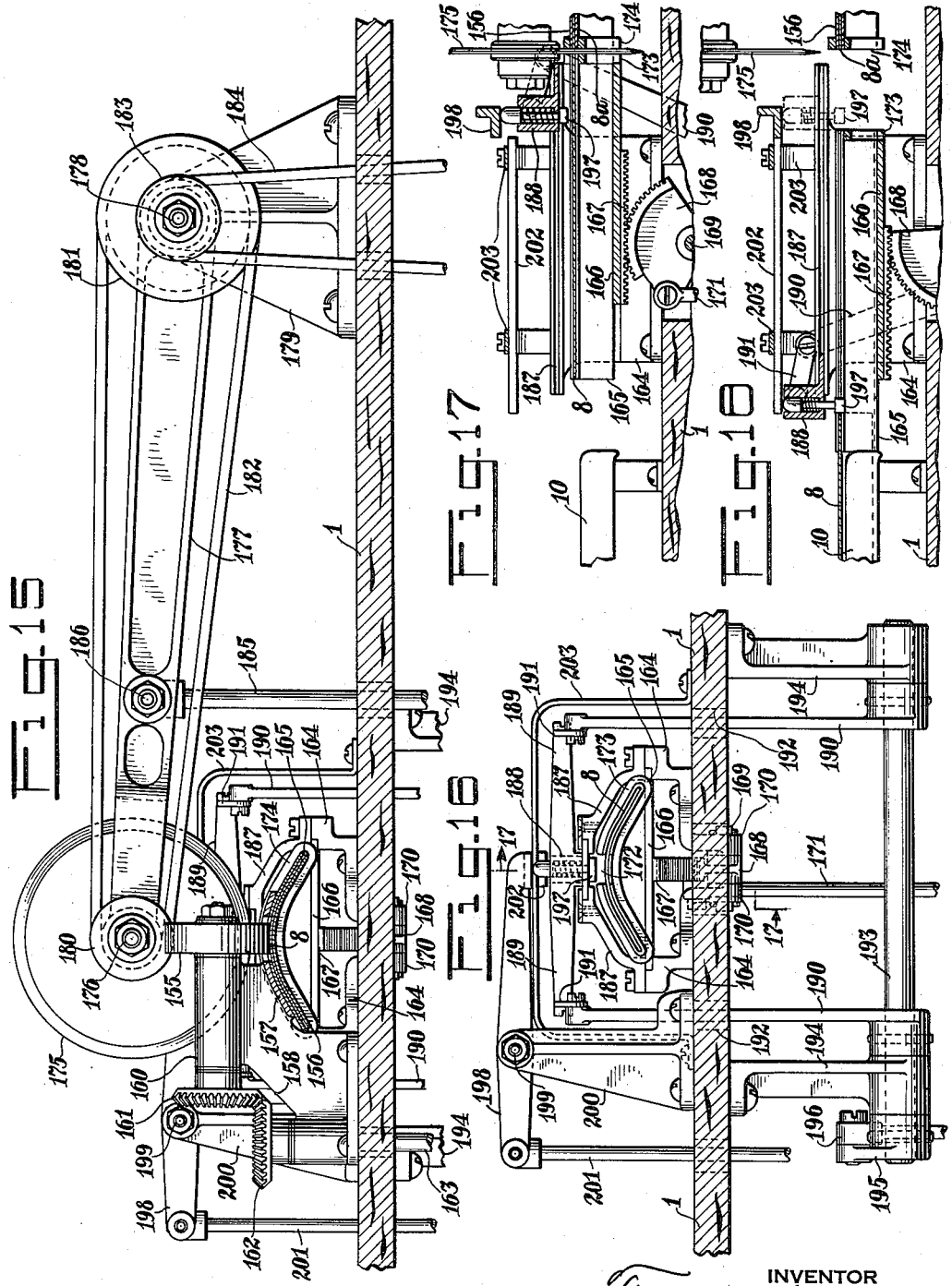

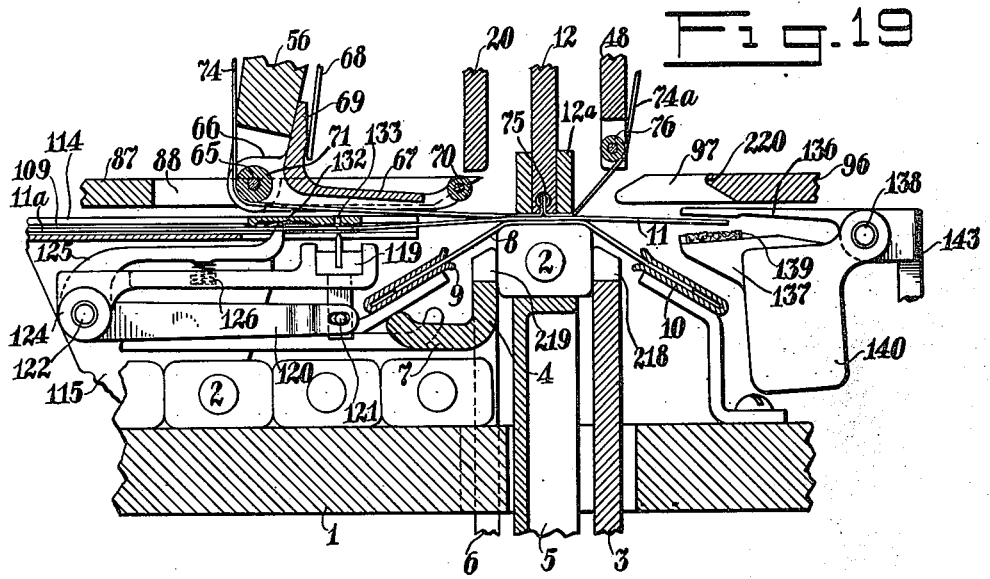
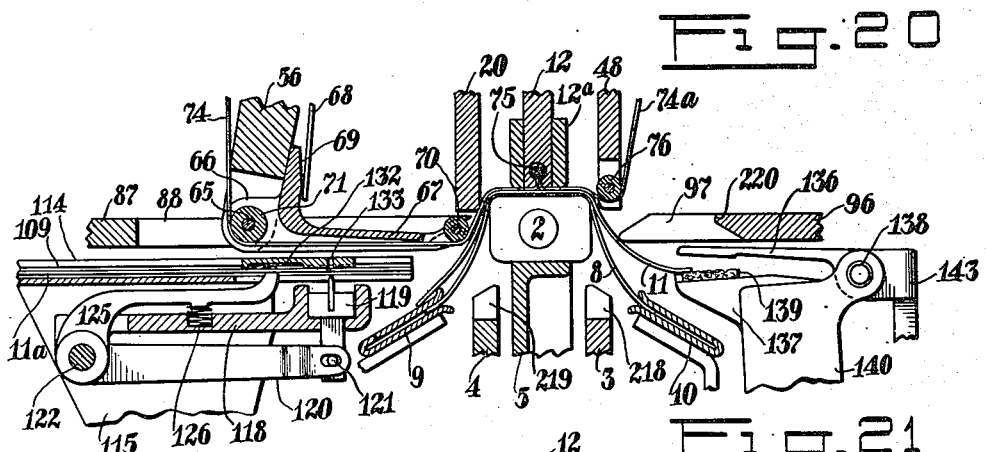
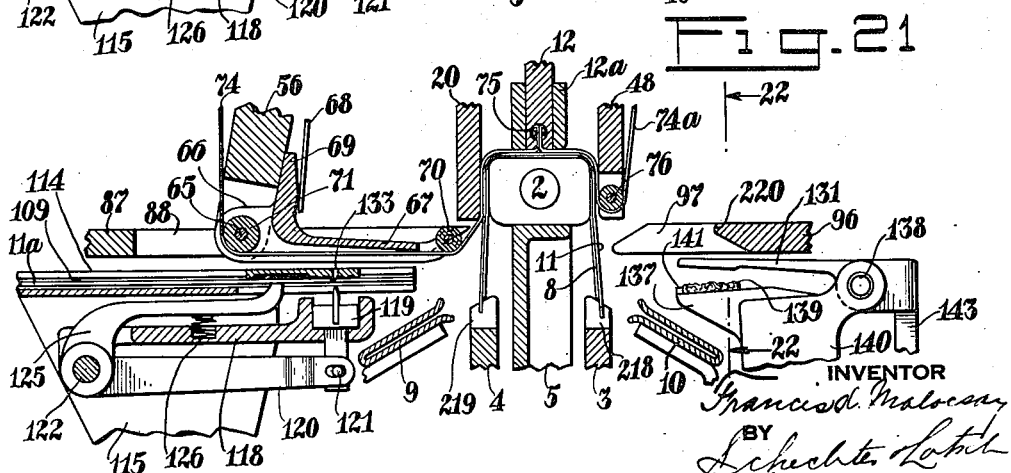

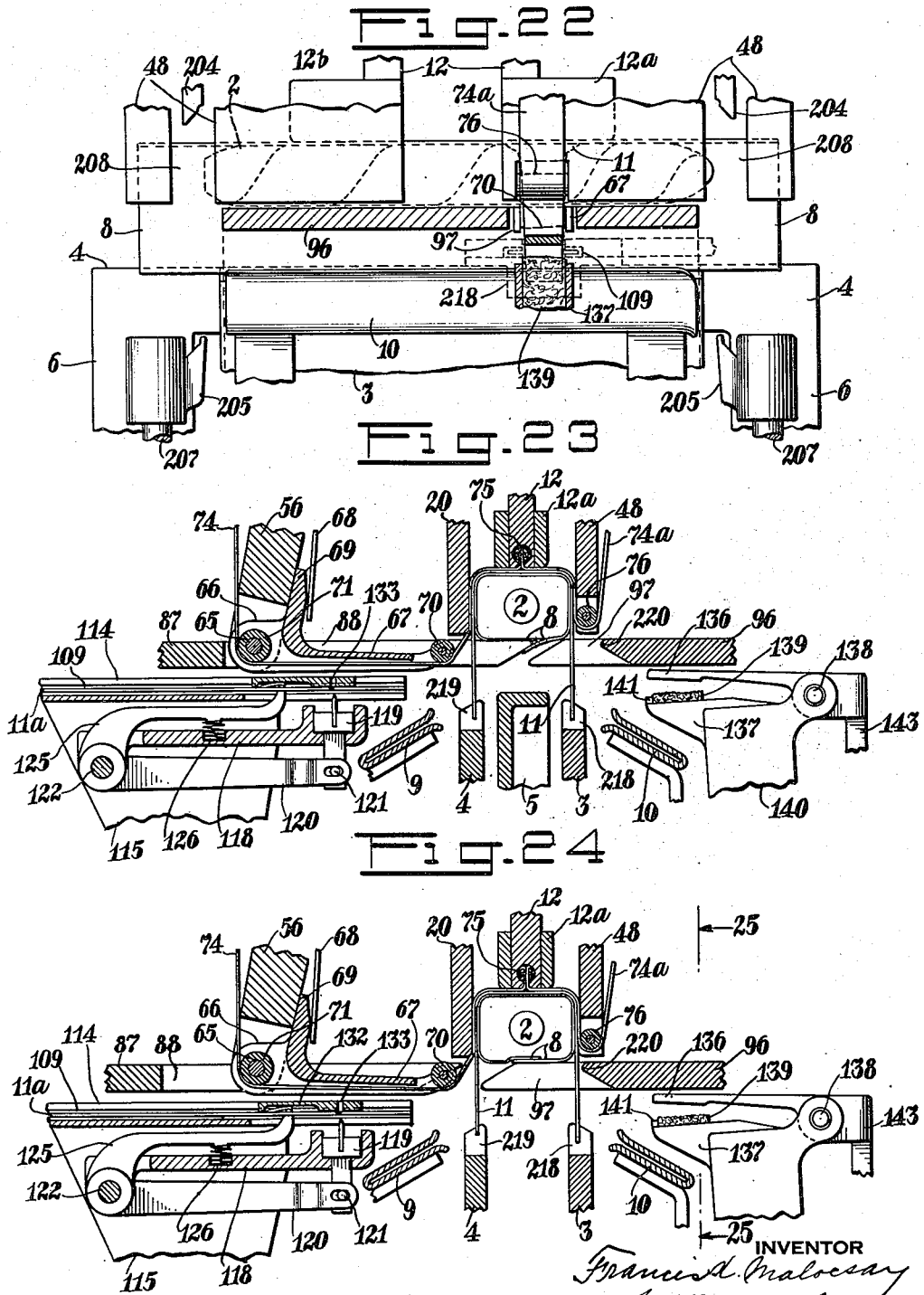

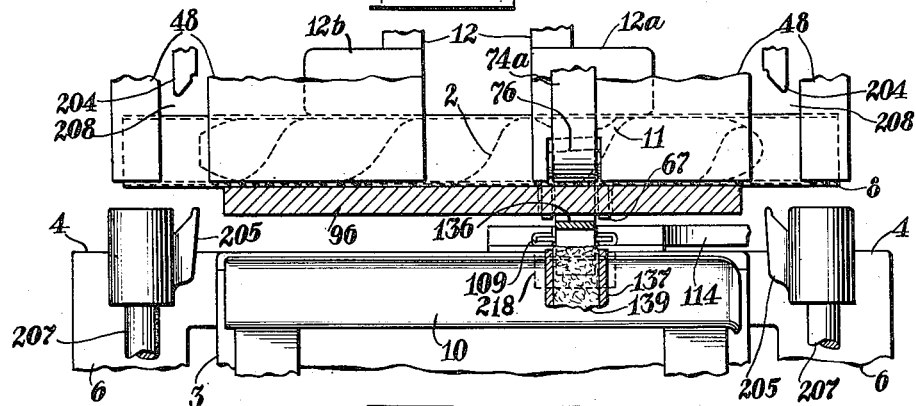
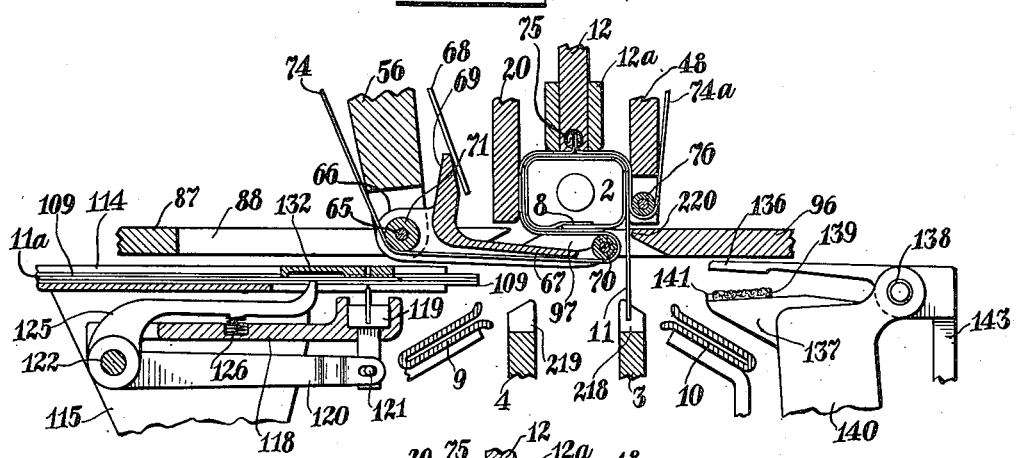
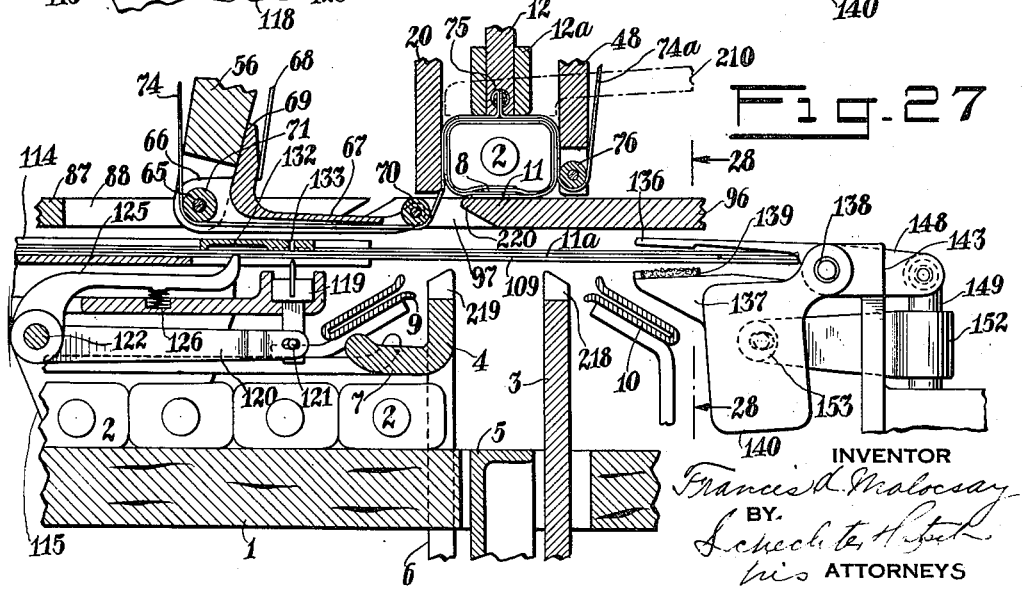

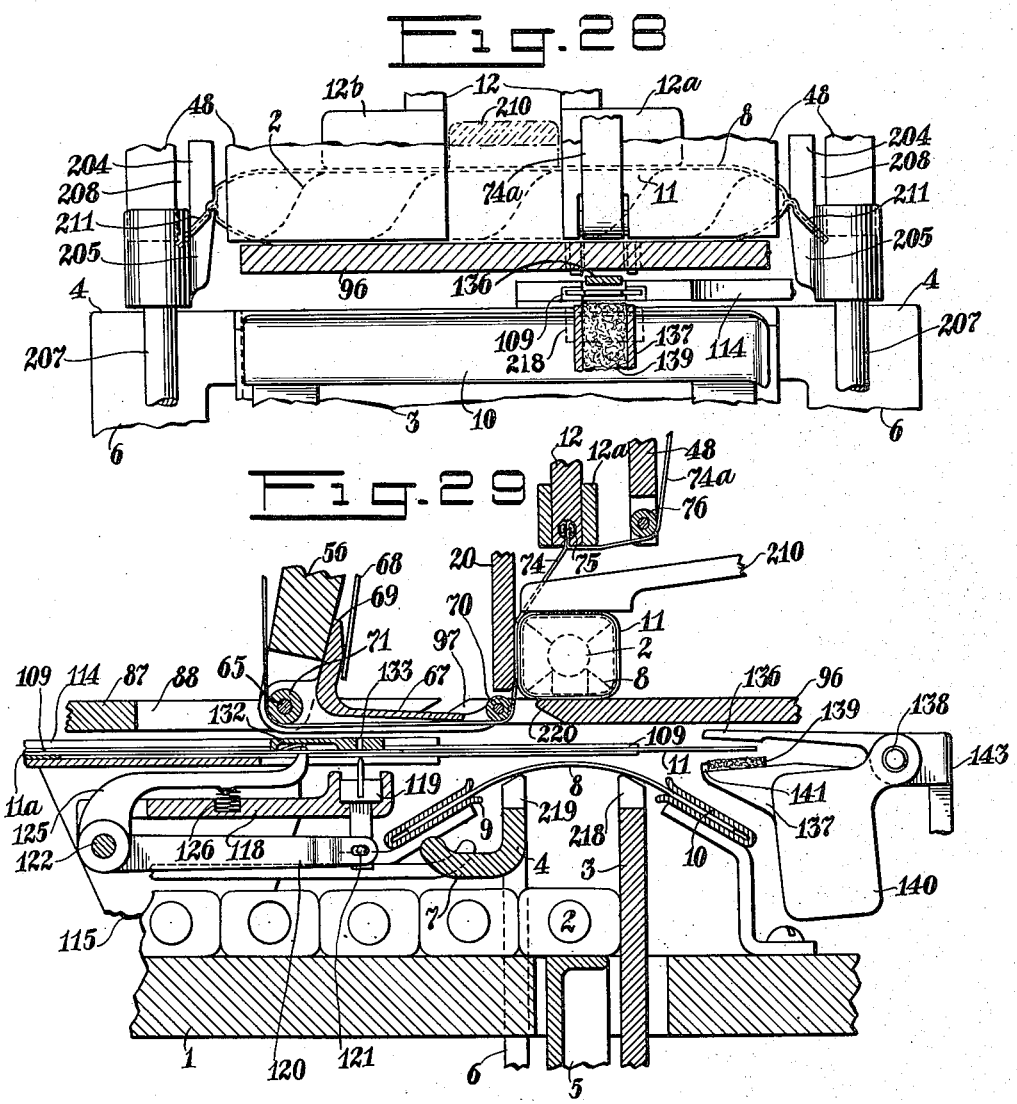

Patented Aug. 11, 1936

2,050,714

UNITED STATES PATENT OFFICE

2,050,714

WRAPPING AND BANDING MACHINE

Francis X. Malocsay, Upper Saddle River, N. J., assignor, by mesne assignments, to Consolidated International Corporation, a corporation of New York Application April 7, 1932, Serial No. 603,815

11 Claims. (Cl. 93—2)

This invention relates generally to article-wrapping and banding machines, and while broadly applicable, is particularly concerned with the wrapping of cigars in a wrapping material and the banding of said cigars. It is especially adapted to the wrapping of cigars in transparent cellulosic sheet material, marketed under the trade name of "cellophane" or other similar material, preferably of the moisture-proof variety.

While a number of wrapping and banding machines have been invented which successfully wrap small packages or cigars in tin foil, tissue paper or other easily pliable material, it is found in practice that they do not satisfactorily perform this operation with such recalcitrant and rather resilient wrapping material, as cellophane. The reason is that these machines either work on the so-called turret principle and wrap and band cigars or packages progressively in different stations—which is perfectly feasible with tin foil or even common paper—or involve another locomotory principle, using conveyors or lifts with different stops. It is evident that such arrangement is bound to give faulty results in a proposition like that of the present invention, where a flat sheet of springy material, like cellophane, is wrapped about a cigar and no other means are employed to lock and keep it in place but a cigar band; i. e., a girdle of paper with one gummed and moistened end, in the middle and/or two downwardly bent and scored folds at the ends of the wrapper. It would require too much auxiliary guiding mechanism to keep the wrapper from unfolding before it reaches the last banding and sealing station. This drawback is overcome by a principle, which is embodied in the present invention, to wit: that the wrapping, banding and tip-sealing operations are carried to completion at a single place or station and that the cigar goes through all phases of this process while being held stationary. This has the further advantage of sparing the tobacco wrapper of the cigar from possible damage by transportation and through the change of gripping means in transit.

It is therefore one of the objects of this invention to provide a wrapping and banding machine which will perform the dual function of wrapping and banding a cigar, while the latter is held stationary during these operations.

It is furthermore among the objects of this invention to provide a wrapping and banding machine which will entirely wrap an article and secure a band around said wrapper, and which will automatically deliver said article to the wrapping and banding position, and which will automatically discharge said article after it has been wrapped and banded.

Another object of the invention is to provide a wrapping and banding machine which will entirely wrap an article and secure a band around said wrapped article, said band having been severed from a continuous strip or roll of bands.

Another object of this invention is to provide a mechanism which will wrap and band cigars, said bands for said cigars being delivered to the banding position in a continuous strip, at which point they are severed and secured around the wrapped cigars.

A further object of this invention is to provide a cigar handling mechanism which will automatically feed a continuous strip of cigar bands to a banding position and in perfect alignment to sever the equivalent of one band from the free end of said continuous band strips, moisten the gummed end of said severed band and secure it in position around a wrapped or unwrapped cigar.

Another object of this invention is to provide a cigar wrapping and banding mechanism which will receive a wrapper and a band, each severed from a continuous strip and placed one upon the other in a wrapping and banding position, and which will fold said wrapper around the cigar and then the band without moving the cigar to perform both folding and banding operations.

Another object of this invention is to provide a wrapping and banding machine having a band feed mechanism which will deliver the bands to the banding position in a continuous strip form with a constant length of feed movement regardless of the length of the individual bands comprising said band strip, and said band feed mechanism having adjustable aligning, severing and moistening means to accommodate different lengths of bands.

Another object of this invention is to provide a combination wrapping and banding machine which can be easily and quickly adjusted to entirely wrap an article and discharge it without securing a band around said article and wrapper, or, be so adjusted to discharge a banded but unwrapped article.

A further object of this invention is to provide a cigar wrapping and banding mechanism which will accommodate cigars of various shapes and sizes and which will be particularly adapted for synchronous cooperation with any of the conventional cigar feeding devices, commonly known as hoppers.

A further object of this invention is to provide means to apply gum or an adhesive to the band.

A further object of this invention is to provide means whereby the projecting ends of the wrapper are scored and folded over toward the body of the cigar to lock the wrapper and prevent it from unfolding, even in the case where the banding of the cigar is omitted.

A further object, in compass with the foregoing, is to arrange said means so that they operate upon the wrapper at the same station where the wrapping and the banding is performed.

A further object of this invention is the provision of mechanism for utilizing a continuous strip or roll of bands, whether gummed or ungummed, and to provide means to apply gum or adhesive to the band, or to moisten a gummed band. I have found that when gummed bands are used for banding cigars and are placed in a magazine or band-holder, that such gummed bands have a tendency to adhere or stick or cake together, with the result that the operator must break the adhesion. This is usually accomplished by the operator taking a pile of bands and fanning the gummed ends, and in this manner break the adhesion. In many instances the bands nevertheless adhere together and two or more bands will consequently be removed from the pile of bands. I have found that by use of a roll or continuous strip of bands with the mechanism disclosed in this application, the foregoing difficulties are overcome.

Another object of the invention is to provide a wholly coordinated and combined assembly by which the foregoing objects are carried out in a novel, simple and improved manner and thereby increase the production and reduce the cost of wrapping and banding cigars.

Another object of the invention is to provide a wrapping and banding machine in which the entire operation is automatic and does not require human handling of the articles and which thus greatly reduces the amount of manual labor or supervision required.

A further object of this invention is to provide and construct in a single unit, a combined wrapping and banding mechanism; that is, a machine which will at a definite predetermined position, perform the dual function of applying a wrapper and a band around a cigar, both of which are severed from a continuous strip.

Other more specific objects and advantages of the apparatus will appear as the nature of the improvements are better understood, the invention consisting substantially in the novel arrangement and corelation of instrumentalities herein fully described and illustrated in the accompanying drawings wherein similar reference characters are used to describe corresponding parts throughout the several views and then finally pointed out and specifically defined and indicated in the appended claims.

The disclosure made the basis of exemplifying the present inventive concept suggests a practical embodiment thereof, but the invention is not to be restricted to the exact details of this disclosure, and the latter therefore is to be understood from an illustrative, rather than a restrictive standpoint. It will be understood that the various features of the invention may be separately applicable despite their cooperation herein shown.

In this specification no detail description of the operation of the cigar feed or hopper mechanism will be given, as this type of mechanism is fully described and illustrated in my Patent No. 1,653,641, dated December 27, 1927, and in my applications, Serial Number 492,437, filed October 31, 1930, on Cigar banding machines, Serial Number 519,347, filed March 2, 1931, on Cigar handling machines and Serial Number 526,788, filed April 1, 1931, on Cigar machines.

In the embodiment of the invention as herein disclosed there is provided a table, upon the top of which the cigars are fed from a hopper which is not shown in the drawings, but which would be located at the left hand side of Figs. 1 and 5 and operated in a synchronous manner with the wrapping and banding operation. The cigars move with an intermittent movement. The rest periods between the forward movements of the cigars being equal to one complete cycle of the wrapping and banding mechanism. The band strip is fed from a roll located at the left hand side of the machine as illustrated in Fig. 5. Its path of travel is above and parallel to the path of travel of the cigars, and its free end is aligned by an aligning member. Its right hand end is then gripped by a moistening member and a cutter severs a band from the strip. During the aligning, moistening and severing of the band, the cellophane wrapper is fed into position underneath the band from the rear of the machine by the wrapper feed and cutting mechanism illustrated in Figs. 13 and 14. The cigars are guided upward between adjustable guides by a plunger. This upward movement causes the wrapper and band to be folded around three sides of the cigar with the aid of automatically adjusted side plates. The cigar is held in this position while the wrapper and band are folded around the fourth side of the cigar. At the completion of this operation, the ends of the folded wrapper which extend beyond the extremities of the cigar are folded and scored in order to cause the folded portions to spring inward toward the cigar as illustrated in Fig. 30. This operation completes the wrapping and banding of the cigar. All of the parts which comprise this wrapping and banding mechanism are driven directly or indirectly from a common drive mechanism which is not shown in the drawings as it forms no part of this invention and would also serve to drive the cigar hopper and feed mechanism with which it will cooperate.

The combination wrapping and banding mechanism illustrated in the accompanying drawings will function in the same manner as described hereinafter whether it is to be utilized purely as a cigar wrapping mechanism or a banding mechanism. The wrapper and band feed mechanisms, as stated above are driven from a common source, and it is at this point that a simple and effective clutch or transmission is located to transmit the power to these mechanisms. By manipulation of this clutch or transmission, the wrapper feed mechanism can be quickly thrown out of operation and a banded and unwrapped cigar will be ejected, and likewise, by throwing the band feed mechanism out of operation, a wrapped but unbanded cigar will be ejected. With these adjustments in mind, it is readily seen that should it be so desired, cigars could first be banded and then fed through the mechanism a second time to be wrapped. This method of operation places the band directly around the cigar instead of around the wrapper. I also wish to state at this time that this mechanism is also applicable to that type of wrapper for a cigar upon which a facsimile of a band has been printed, said type of wrapper being fully described in my copending application filed March 31st, 1931, Serial No. 526,632.

In connection with the features hereinafter specifically pointed out, and in addition to the many unique and improved structural combinations, the invention is also concerned with the specific mechanical means by which the various advantageous functions are achieved; said mechanical means being combined to provide an automatic, simple, inexpensive, rugged and durable apparatus.

The inventive idea involved is capable of receiving a variety of mechanical expressions, one of which for the purpose of illustration is shown in the accompanying drawings, in which—

Fig. 2 is a sectional view taken on the line 2—2 of Fig. 1;

Fig. 3 is a sectional plan view taken on the line 3—3 of Fig. 2;

Fig. 4 is a sectional plan view taken on line 4—4 of Fig. 2, illustrating the band strip aligning, severing and gum moistening members;

Fig. 5 is a sectional view taken on line 5—5 of Fig. 2, illustrating the band feed mechanism;

Fig. 6 is a sectional view taken on line 6—6 of Fig. 5;

Fig. 7 is a detail cross-sectional view taken on line 7—7 of Fig. 5, illustrating the band severing knife in its cutting position;

Fig. 8 is a detail cross-sectional view taken on the line 8—8 of Fig. 5, illustrating the position of the aligning pawl when engaging the band strip;

Fig. 9 is an end elevation of the band strip feed mechanism looking in the direction of the arrow 9 at the left hand side of Fig. 5;

Fig. 10 is a detail plan view taken on the line 10—10 of Fig. 9 illustrating the band strip feeding pawl;

Fig. 11 is a sectional view taken on the line 11—11 of Fig. 10;

Fig. 12 is a detail cross-sectional view taken on the line 12—12 of Fig. 11;

Fig. 13 is a plan view, partly broken away, of the wrapper strip feed mechanism;

Fig. 14 is a side elevation of Fig. 13;

Fig. 15 is a cross-sectional view taken on the line 15—15 of Fig. 13 of wrapper strip feed roller and cutting member;

Fig. 16 is a cross-sectional view taken on the line 16—16 of Fig. 13 illustrating the wrapper carrier members;

Fig. 17 is a detail cross-sectional view taken on the line 17—17 of Fig. 16 of wrapper carrier members illustrating the position of the parts at the completion of the cutting operation of the wrapper knife;

Fig. 18 is a view similar to Fig. 17 illustrating the wrapper carrier members at the completion of their delivery of the wrapper into the wrapper holding members located under the wrapping and banding mechanism illustrated in Fig. 1;

Fig. 19 is a detail sectional view illustrating the position of the wrapping, banding, aligning, severing and moistening members at the start of the wrapping operation, the aligning pawl retaining the band strip in position by engaging a slit cut in the band strip;

Fig. 20 is a detail sectional view illustrating the position of the wrapping and banding members during the first step of the wrapping and banding operation;

Fig. 21 is a similar view illustrating the completion of the first wrapping and banding step;

Fig. 22 is a sectional side view taken on the line 22—22 of Fig. 21; which illustrates the position of the end folders with respect to the wrapper when it is in the position shown in Fig. 21;

Fig. 23 is a detail sectional view illustrating the beginning of the second step of the wrapping operation which shows how the wrapper is folded around the bottom of the cigar;

Fig. 24 is a similar view which illustrates the completion of the operation of folding the wrapper around the cigar;

Fig. 25 is a sectional side view taken on the line 25—25 of Fig. 24 which illustrates the position of the lower end folders after the wrapper has been folded under the cigar as shown in Fig. 9;

Fig. 26 is a detail sectional view illustrating the first step of the operation of folding the ends of the band under the cigar and the start forward of the band strip carrier, the aligning pawl having been forced downward and out of engagement with alignment slit by the forward movement of the band strip;

Fig. 27 is a similar view illustrating the completion of the banding operation and the completion of the forward movement of the band strip carrier; the aligning pawl is still in contact with the under surface of the band strip; the next successive alignment slit in the strip having been carried past the pawl by full forward movement of the carrier;

Fig. 28 is a sectional side view taken on the line 28—28 of Fig. 27 illustrating the folding and scoring of the ends of the wrapper extending beyond the ends of the cigar;

Fig. 29 is a detail sectional view illustrating the position of the parts prior to the ejecting of the wrapped and banded cigar; another wrapper and cigar have been brought into position and the band strip carrier is shown returning to its normal position with the aligning pawl engaging the alignment slit and retaining the band strip in position;

Fig. 30 is a side view of the completely wrapped and banded cigar; and

Fig. 31 is a bottom view of Fig. 30.

Figure 1:
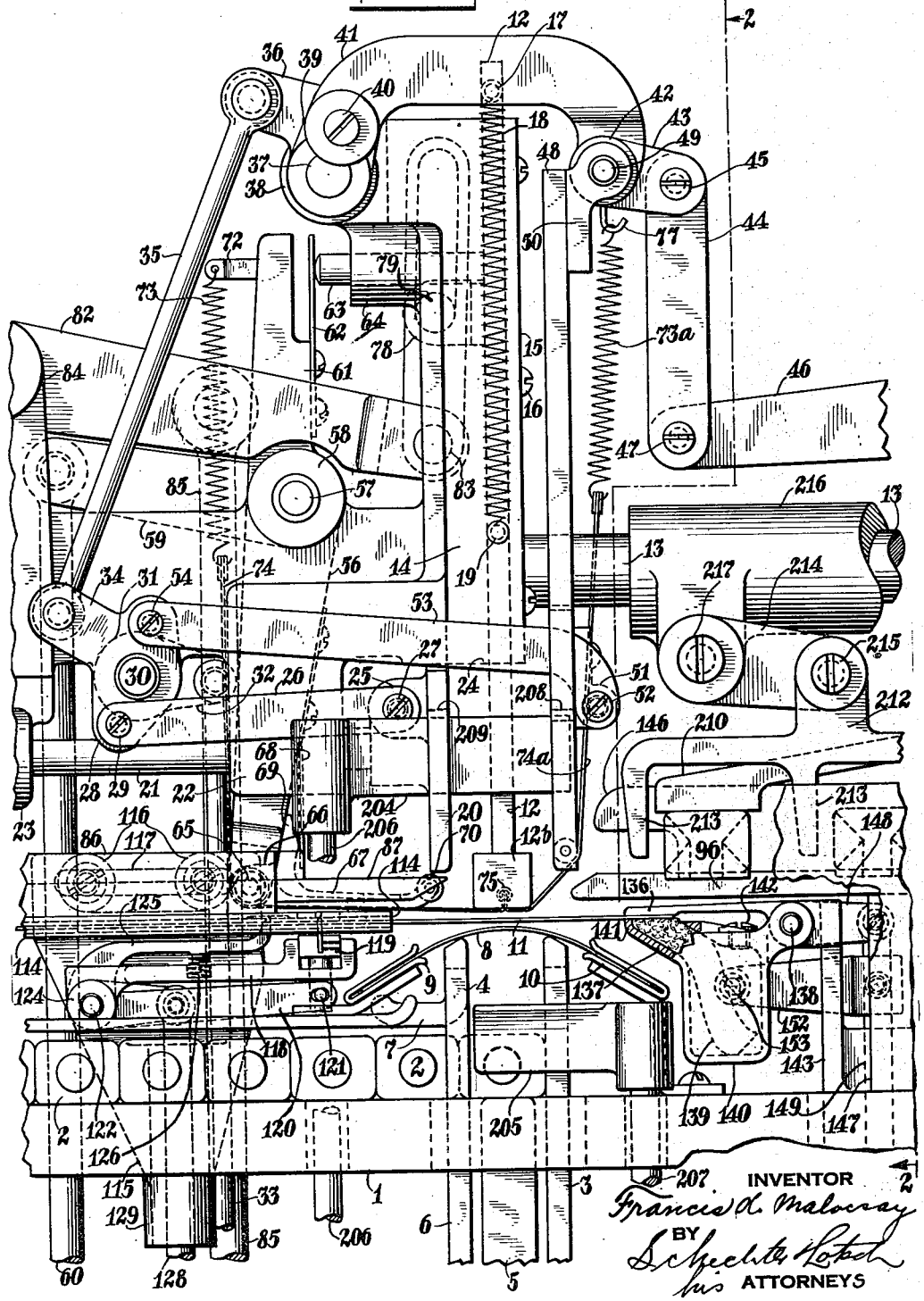
Fig. 1 is a front elevation, partly broken away, of my improved wrapping and banding mechanism.

With particular reference to Figs. 1 to 16, numeral 1 represents a table upon which my wrapping and banding mechanism is mounted, and upon which the cigars 2 are moved toward said mechanism from a cooperating hopper not shown, but which is also mounted upon the table. The cigars move forward with an intermittent movement from the hopper upon a conveyor; the surface speed of which is slightly greater than is necessary to feed the cigars up to the wrapping and banding position as shown in Fig. 1, and it is because of this that any space between the individual cigars is gradually eliminated, and the cigars kept in close contact with one another as they approach the wrapping and banding mechanism. A slight slippage between the cigars and the conveyor insures their close contact and prevents jamming. The first cigar is brought into contact with a centering plate 3 which protrudes upward through the table and in the path of the cigars as shown in Fig. 1. This centering plate 3 is linked to the centering plate 4 at its lower extremities (not shown) in such a manner to insure equal spread of these plates when the plunger 5 pushes the cigar upward between them as illustrated in Fig. 19. The centering plate 4 has the downwardly extending legs 6 to which the plate 4 is linked, and which are far enough apart to allow the cigars to pass between them. The outwardly extending flange 7 is integral with the plate 4 and acts as a guide.

Located above the top edges of the centering plates 3 and 4 and bent downward is the wrapper 8; its outer ends being held in the supports 9 and 10. The mechanism utilized for the delivery of the wrapper to this position will be fully described hereinafter. Extending at right angles across the top of the wrapper is the cigar band 11, and the mechanism required to deliver it into position will also be fully described hereinafter. Directly above the wrapper and band, and centrally located between the two centering plates is a plunger comprised of the two feet, 12ª and 12ᵇ and the slide plate 12, the center of which is cut away to span the rod 13, which is clearly illustrated in Fig. 2. The plunger 12 is slidably mounted in a guide comprised of the upwardly extending bracket 14 and the retaining plates 15 which are held in position by the screws 16. Extending outward from the sides of the plunger slide plate 12 and located at its uppermost extremity are the spring supporting pins 17. (See Figs. 1 and 2.) Around the ends of these pins and in suitable grooves are hooked the light coil springs 18, the lower ends of which are secured in suitable grooves in the ends of the anchor pins 19 which are carried in the casting 14. The purpose of these springs is to push the plunger downward with just enough force to prevent the wrapper and band from slipping when a cigar is pushed upward into the position as illustrated in Fig. 5.

Located at the left hand side of the plunger 12 (Fig. 1) is the plate 20 which is mounted upon the rod 21 slidably mounted in the bearings 22 and 23 which are a part of the bracket 14, and the top surface of said plate is in sliding contact with the machined bottom surface 24 of the bracket 14 which prevents the plate from turning about the axis of its supporting rod 21. Integral with the rear surface of the plate 20 and located near the ends of which, are the lugs 25 to which are hinged the connecting links 26 by means of the shouldered screws 27. (See Figs. 1 and 3.) The opposite ends of these links 26 are hinged to one side of the toggle levers 28 by the shouldered screws 29. The toggle levers are pinned securely upon the shaft 30 mounted in the bearing 31, integral with a portion of the bracket 14. The shaft 30 extends beyond the rear toggle lever as illustrated in Fig. 3, and upon this extension is secured the lever 32. Fastened to the end of this lever is the push rod 33 which is moved up and down by a cam which is part of the main drive mechanism which is not shown in the drawings. Fastened to the extensions 34 of the toggle levers 28 are the connecting rods 35; the upper ends of which are connected to the levers 36 secured upon the shaft 37. The shaft 37 is carried in the bearing 38 integral with the top of bracket 14 (Fig. 1) and has secured to its outer ends, the arms 39. Hinged to these arms by means of the screws 40 are the connecting arms 41 of the bell crank 42. Integral with the center of the bell crank 42 are the lugs 43, between which is connected the link 44 by means of the pivot screw pin 45. The lower end of link 44 is connected to the lever 46 by the pivot screw 47. The lever 46 is mechanically connected to a cam, not shown, which is part of the main drive mechanism. The bell crank 42 is secured to the top of plate 48 by means of the shaft 49 and the bearing blocks 50. Hinged to the plate 48 are the connecting links 53. These links pass through suitable apertures 55 cut in the plate and are connected to the hinge blocks 51 by the screw pins 52. The other ends of the connecting links 53 are connected to the toggle levers 28 by the screw pins 54. The combination of links 26 and 53, the toggles 28, the links 35, arms 36, levers 39 and bell crank 42 impart a parallel movement to the plates 20 and 48 when the push rod 33 is actuated; the purpose of which is more fully described hereinafter.

The rocker arm 56 is supported on the pin 57 mounted in the boss 58 of the bracket 14 (see Fig. 1). Secured upon a rearwardly extending portion of the shaft 57 is the lever 59 to which is connected the push rod 60 which extends downward through the table 1 and is mechanically connected to a cam, not shown, but which is part of the main drive mechanism. The upper end 61 of the rocker arm 56 has secured to it the flat spring 62, the purpose of which is to exert a pressure upon the plunger retaining pin 63, slidably mounted in the boss 64 of bracket 14 when the lower end of said rocker arm is swung in a clockwise direction as illustrated in those steps of the wrapping and banding operation shown in Figs. 21, 23, and 24. This pressure against said pin 63 causes it to bear against the plunger slide plate 12 which holds it in position against the pull of the coil springs 18 when the plunger 5 moves downward and away from the bottom of the cigar.

Hinged to the lower end of the rocker arm 56, by means of the pin 65 and the lugs 66, is the band folding finger 67. This finger is held in its normal position as shown in the various views by the flat spring 68 pressing against the tongue 69 integral with said finger; said flat spring being secured to the rocker arm 56. Suspended between two projections which form the front end of the finger 67 is the roller 70, and suspended upon the pin 65 and located between the lugs 66 is the roller 71, the purpose of these rollers and the finger being fully described hereinafter.

Driven into the upper end 61 of the rocker arm 56 is the anchor pin 72 to which is hooked the light coil spring 73. (See Fig. 1.) To the lower end of this coil spring is hooked the fabric tape 74 which passes around the roller 71 and between the side flanges of the finger 67 to the under side of the plunger foot 12ª where it is anchored by pushing its rolled and sewed end into the slotted hole 75 for that purpose, which is clearly illustrated in Fig. 19. Also anchored in this same slotted hole 75 is the rolled and sewed end of the fabric tape 74ª which passes under the plunger foot 12ª and around the roller 76 carried in the cut-out portion in the bottom of the pressure plate 48. The upper end of this tape 74ª is hooked to the coil spring 73ª, which is similar to coil spring 73, the upper end of which is anchored to the hook 77 which is fastened in the bell crank 42.

Secured to the plunger slide plate 12 (see Fig. 1) is the bracket 78 having the pin 79 engaging in the slot 80 of the pusher link 81 which is connected to the lever 82 by means of the pin 83 (see Figs. 1 and 5). The lever 82 is pivotally connected to the bracket 84 which is fastened to the extension of bracket 14. Also connected to the lever 82 is the push rod 85 which is mechanically connected to a cam, not shown, which is a part of the main drive mechanism. The purpose of this push rod, lever link and bracket is to move the plunger, comprising the feet 12ª, 12ᵇ, and slide plate 12 upward to allow the completely wrapped and banded cigar to be easily removed as illustrated in Fig. 29. The lever 46 with its link 44 are provided to raise the plate 48 for the same purpose, which is also illustrated in Fig. 29.

Slidably mounted in the side frames 86 is the folder plate 87, which is apertured at 88 (see Fig. 3) to allow for proper positioning of the finger 67 and to allow for free movement between the rocker arm 56 and said plate as illustrated in Fig.

23. A further object of said aperture 88 will be more fully described hereinafter. Toward the rear of the folder plate 87 and centrally located (see Fig. 3) is secured the gear rack 89 which engages with the gear sector 90 pinned upon the shaft 91 mounted in the bearings 92 which are integral with the side frames 86. Upon the rear end of the shaft 91 is secured the arm 93 to which is connected the push rod 94. This rod is mechanically connected to a cam which is not shown, but which is a part of the main drive mechanism of the machine. The collar 95 on shaft 91 prevents the shaft from sliding and thereby preventing the rack and gear sector from disengaging. An up and down movement applied to the push rod 94 by its operating cam causes the folder plate 87 to move forward and backward in proper synchronization with the rest of the mechanism.

Opposite the folder plate 87, and on the same level with it, is the folder plate 96, which is slidably mounted in a suitable guide to allow it to be freely moved forward and backward by a rack and gear sector (not shown) but which is similar to that described in connection with folder plate 87, but in this instance the rack and gear sector is located underneath the folder plate to allow the completely wrapped and banded cigars to be ejected along its top surface as illustrated in Fig. 1. The front of the said folder plate 96 is slotted as at 97, (see Figs. 2 and 3) and this slot is located directly opposite the opening 88 in folder plate 87. The width of said opening 88 at the front of the plate and the width of slot 97 is such to allow the ends of the greatest width of bands to be used to pass through. The purpose of these openings will be more fully described hereinafter.

Referring more in particular to Figs. 1 and 4 to 12 inclusive, I will now describe the mechanism for feeding the band strip 11ᵃ from which the bands 11 are cut. The band strip is supplied to the mechanism from a roll 11ᵇ (see Figs. 5 and 9) which is loosely mounted on the extending end of the pin 98 rotatably mounted in the bearing bracket 99 which is secured to one of the side frames 86. Engaging the outer surfaces of the band strip roll are the circular friction plates 100 which prevent the unwinding of the roll when the band strip is fed forward. Bearing against the outer friction plate is the knurled nut 101; which serves to hold the band strip roll in position on the pin 98 and also serves to increase or decrease the amount of friction between the inner friction plate and the light compression spring 102 (see Fig. 9), which is housed in the hub 103 of the band strip feed lever 104 which is secured on the pin 98. Also secured to the pin 98 is the lever 105 to which is connected the connecting rod 106. The lower end of the feed lever 104 is bifurcated and its prongs are slotted to engage the pin 107 carried by the bearing block 108 which is brazed, welded or otherwise secured to the band strip carrier 109 through which the band strip 11ᵃ slides. Hinged in the forward end of the bearing block 108 on the hinge pin 110 is the band strip pusher finger 111, the forward end of which is serrated (see Fig. 11) in such a manner to cause it to grip the band strip when the carrier is moved forward and allow it to slide over the surface of the strip when the carrier is returned to its normal position. The pusher finger is held in its operative position by the flat spring 112 which bears against the top surface of the finger, said spring being held in position by the screw 113. The band strip carrier 109 slides in the guide 114 which is secured to the bracket 115 which is adjustably mounted on the rear side frame by means of the screws 116 which engage in the slot 117 cut in the flange of the bracket for that purpose. (See Figs. 1 and 4.) Integral with the bracket 115 is the band cutter bearing plate 118. Slidably mounted in suitable guides integral with the forward end of said plate 118 is the band cutter 119; the shank of which passes downward through the plate to engage with the bifurcated end of the band cutter lever 120 by means of the pin 121 which is driven in said cutter shank. The opposite end of the band cutter lever is secured on the shaft 122 by means of the pin 123; (see Fig. 4) the shaft being mounted in the bearings 124 integral with the cutter bearing plate 118 and the bracket 115. Also mounted upon the shaft 122, but free to rotate, is the aligning pawl 125 which is urged upward by the light coil spring 126 retained in position by engaging in a circular recess machined in the top surface of the bearing plate for that purpose. Secured to the end of shaft 122 extending beyond the rear of the bracket 115, (see Fig. 4) is the lever 127, to which is connected the push rod 128, said connection between the lever and rod being such to allow the lever to be swung freely by a perpendicular movement of the push rod. The push rod is held in its perpendicular position by the bearing 129 integral with the lower end of the bracket 115 (see Figs. 1 and 4) and extends downward to the main drive mechanism where it is actuated by a cam which is not shown in the drawings. The bearing 129 and part of the bracket 115 extend downward into the opening 130 cut into the table 1, and its width is such to allow for adjusting said bracket to meet the requirements of the length of band to be used. The nose of the aligning pawl 125 engages in the U-shaped slits 131 cut in the band strip (see Figs. 4, 8 and 19) but does so only upon the return stroke of the band strip carrier 109 which will be more fully described hereinafter. Referring to Fig. 8 it will be seen that I have provided a recess 132 in the top plate of the band carrier guide 114 to insure the engagement of the pawl in said slits 131. Referring to Figs. 1, 4, and 8, it will be seen that the top plate of the band carrier guide 114 is also provided with the rectangular slot 133 through which the cutter blade passes when it cuts off a band. The edges of this slot adjacent to the band strip act as the stationary cutting edge for the cutter. The opening 134 cut in the top plate of the carrier guide, which is most clearly shown in Fig. 4, is provided for the purpose of allowing the band strip pusher finger 111 to be moved forward to within one-half a band length of the aligning pawl, and the slot 135 cut in the end of the folder plate 87 (see Fig. 10) is provided to receive the bearing block 108 and the flat spring 112 when the band strip carrier is in its forward position.

Located at the right hand side of the centering plates 3 and 4, (Figs. 1 and 4) and in a direct line with the band strip, are the moistening jaws 136 and 137. The upper jaw 136 is a narrow finger-like member which is pinned on the shaft 138 from which it receives its opening and closing action. The lower jaw 137 is rotatably hung on the shaft 138 and comprises the moistening wick 139 and the water compartment 140 integral with the jaw. The front edge of the jaw has the raised portion 141 (Figs. 19 to 29) which, in cooperation with the front edge of the upper jaw, hold the severed band 11 in position (see Fig. 1) until the cigar 2 is brought into the position illustrated in Fig. 19. During the gripping position, the moistening wick 139 is in contact with the gummed surface of the band. The screw 142 is provided to close the water inlet of the water compartment. The shaft 138 is mounted in the adjustable bracket 143 (see Fig. 4) which is held in position by the screws 144 engaging in the slot 145 machined in the flange of the bracket for that purpose; said flange being clamped against the surface of the rear cigar guide plate 146. The cigar guide plates 146 are secured to the sides of the channels 147 upon the top of which, and between the cigar guide plates, the folder plate 96 slides. Secured upon the rear end of the shaft 138 is the lever 148 to which is connected the push rod 149. The connection between the arm and the push rod is such to allow the arm to be swung by a perpendicular movement of the push rod which is slidably mounted in the bearing 150 integral with the bottom of the bracket 143. The bottom of the bracket and the push rod extend downward through the opening 151 cut in the table 1. The width of this opening is such to allow for the adjustment of the bracket 143 to meet requirements of the length of the band to be used. The push rod 149 is actuated by a cam not shown in the drawings. Secured in position upon the push rod is the arm 152 which is connected to rocker arm 153 secured in the side of the water compartment 140. (See Fig. 4.) Referring to Figs. 1 and 27 it will be readily seen that the upward movement of the push rod will close both jaws 136 and 137.

Referring more in particular to Figs. 13 to 18 inclusive I will now describe the wrapper feed mechanism. The cellophane wrapper strip 8ᵃ is fed to the mechanism from the roll 8ᵇ which is supported by the brackets 154 fastened to rear of the table 1. The wrapper strip is drawn from the roll 8ᵇ by the rubber covered roller 155 mounted above the wrapper former 156, which consists of two sheets of metal placed one above the other, with just enough space between them to allow the wrapper strip to pass through. The top sheet of the former is apertured to allow the bottom of the roller to contact with the wrapper strip which is most clearly shown in Fig. 15. The former 156 is secured to the saddle 157 integral with the bearing bracket 158 fastened to the top of the table. The roller 155 is fastened upon the shaft 159 carried in the bearing 160 integral with the bearing bracket 158. Upon the opposite end of this shaft is secured the bevel gear 161 which runs in mesh with the bevel gear 162 mounted on the end of the drive shaft 163; said drive shaft receiving its rotation from the main drive mechanism not shown in the drawings. Directly in line with the wrapper former 156 and slidably mounted in the guides 164 is the wrapper shuttle 165. Across the bottom of the shuttle is secured the slide plate 166, the outer edges of which slide in the guides 164. Fastened to the under face of the slide plate and centrally located is the gear rack 167 which meshes with the gear sector 168 mounted on the pin 169 carried by the depending lugs 170 integral with base flanges of the guides 164 which is most clearly illustrated in Fig. 16. Pivotally connected to the gear sector 168 is the push rod 171 which is actuated by a cam which is part of the main drive mechanism which is not shown in the drawings. The body portion of the shuttle 165 is made from two thin sheets of metal bent to form U-shaped members; the rounded portions of which are brazed to the slide plate 166 in such a position to form the slot 172 at their upper ends as illustrated in Fig. 16. The space between the sides of the U-shaped members is just enough to allow the wrapper to pass between them. The two opposing ends of the U-shaped members of the shuttle and the former are protected and reinforced by the yokes 173 and 174 respectively. The space between these yokes, when the shuttle is in its normal position is just enough to allow the circular cutter 175 to pass through, which is clearly illustrated in Fig. 17. The cutter is fast upon the shaft 176 which is journaled in the bifurcated end of the lever 177 which is free to pivot on the pulley shaft 178 journaled in the bearing 179. Also secured upon the shaft 176 is the small pulley 180 which is driven by the large pulley 181, carried on the shaft 178, and the belt 182. The large pulley 181 has integral with it, the small pulley 183, which is driven by the belt 184 engaging in the groove of a suitable pulley located on the main drive shaft which is not illustrated. The cutter lever 177 is moved up and down by the push rod 185 (see Fig. 15) which is pivotally connected to the lever by means of the shouldered pin 186. The push rod is actuated by a cam which is part of the drive mechanism not shown. Located above the wrapper shuttle and slidable in suitable guides 187 is the wrapper pusher block 188, which is most clearly illustrated in Figs. 16, 17, and 18. The pusher block 188 has the outwardly extending arms 189 which are linked to the levers 190 by the connecting links 191. The levers 190 extend upwardly through suitable apertures 192 cut in the table 1 for this purpose. The lower ends of the levers 190 are pinned on the shaft 193 which is journaled in the bearing brackets 194 fastened to the underside of the table as illustrated in Fig. 16. A reciprocating motion is imparted to the levers 190 by the lever 195 pinned on the outer end of the shaft 193 and the push rod 196 connected to it. Slidably mounted in the pusher block 188, and spring actuated to hold it in its normal position, is the wrapper pusher 197 which is clearly shown in Figs. 16 and 17. To force the wrapper pusher 197 downward against its spring is the rocker arm 198 which is pivoted on the shouldered pin 199 supported in the bracket 200 secured upon the top of the table. The rocker arm is actuated by the push rod 201 which extends downward through the table to the main drive mechanism. When the wrapper pusher is forced downward as illustrated in Fig. 18 by the rocker arm 198, the pusher block 188 is then moved forward by the levers 190. During the forward movement of the pusher block, the wrapper pusher must be held in its depressed position, and it is for this purpose that I have provided the rail 202 suspended from the center of the supports 203 which straddle the wrapper shuttle mechanism.

Referring to Figs. 1, 2 and 3 and more in particular to the latter two, it will be seen that there are two pairs of wrapper end folders. The top folders are designated by the numeral 204 and the bottom folders by the numeral 205. The top folders 204 are supported on the rods 206 and the bottom folders are supported by the rods 207; all of said rods pass downward through the table 1, below which each pair is actuated by its independent cam, not shown in the drawings, but which will actuate them in a synchronous manner with the rest of the mechanism as said cams are a part of the main drive mechanism. The end folders are free to move up and down in the slots 208 cut in the plate 48 and the slots 209 cut in the plate 20. (See Figs. 2 and 3.) The lower edges of the top folders are beveled and grooved to correspond to a bevel and bead on the top edges of the bottom folders, (see Fig. 13) the purpose of which will be more fully described hereinafter.

When the cigars are completely wrapped and banded, they are ejected from the wrapping and banding position by the ejector finger 210 and the rearward movement of the folder plate 96. The ejector finger receives its movement from a combination of levers which are actuated by a cam forming part of the main drive which is not shown in the drawings. As the wrapped and banded cigars are ejected, they are guided between the guides 146 which are secured to the channels 147. (See Figs. 1 and 2). The guides 146 prevent the folded down ends 211 of the wrapper (see Figs. 28, 30, and 31) from being sprung outward and retain the cigars in a uniform line as they are moved away from the wrapping and banding mechanism by the reciprocating members 212, (Figs. 1 and 3) which have integral with them the downwardly extending prongs 213. These reciprocating members are connected to the links 214 by the pivot screws 215, and said links are connected to the reciprocating carrying member 216 which is slidably mounted on the shaft 13 by the pivot screws 217. The reciprocating members 212 also receive their motion from the main drive mechanism, and their operation will be more fully described hereinafter.

Having thus described my invention in detail, I will now describe its operation.

Refering to Fig. 1 it will be seen that the first cigar has been moved up into contact with the centering plate 3, and upon the top of plunger 5 by a cooperating feed mechanism and the wrapper 8 and band 11 have been fed into position by their respective feed mechanisms, and before describing the cycle of operation pertaining to the wrapping and banding of the cigar, I will describe the operation of feeding the band and wrapper into position as illustrated in Fig. 1.

As already referred to herein, the cigar bands 11 are severed from the band strip 11ᵃ which is supplied to the machine in the form of the roll 11ᵇ as illustrated in Fig. 5. To thread the band strip in position, the knurled nut 101 and the friction plate 100 are removed and the roll of band strip is slipped on the pin 98. The friction plate and knurled nut are then replaced; the nut being screwed on until a sufficient amount of tension has been built up by the compression of the coil spring 102 (Fig. 9) to create enough friction between itself and the second friction plate to prevent the roll from unwinding when the band strip is pulled. The band strip is fed downward from the roll, and around and under the curved end of the bearing block 108, from which point it is threaded into the band strip carrier 109 a distance sufficient to cause the nose of the aligning pawl 125 to engage the first U-shaped slit 131. This will bring the end of the band strip into alignment with the blade of the band cutter 119 as illustrated in Fig. 20, reference to which is solely for the purpose of locating the end of the band strip at the completion of the hand threading operation, as the figure itself illustrates one of the various stages of the wrapping and banding operation. With the band strip in this position, and considering all other elements in their respective operative positions, the machine is caused to operate. Simultaneous with the positioning of a cigar over the plunger 5 as illustrated in Fig. 1, the connecting rod 106 (Fig. 5) is pulled downward by its actuating mechanism. This action causes the lever 105 to be swung in a counter clockwise direction, which will cause the pin 98 to swing the band strip feed lever 104 into the position illustrated by dot and dash lines. This forward swing of the lever 104 slides the band strip carrier 109 forward in its guide 114, due to their being connected by the bearing block 108, until the said carrier has taken the position illustrated in Fig. 27. During this movement of the carrier, the band strip has also been carried forward with it because of the pressure exerted upon the pusher finger 111 by the flat spring 112, which causes the serrated end of said pusher to bite into the strip, thereby gripping it firmly and holding it against the drag created by the coil spring 102 and the friction plate 100. The length of this forward movement of the band strip carrier is constant, irrespective of the length of band required to encircle the cigar, its full movement being slightly greater than the length of the longest band required for the banding of cigars. When the band strip was moved forward, the aligning pawl 125 was swung downward and out of the U-shaped slit due to the unslit portion of the strip contacting with the rounded side of its nose; and as the strip continues to move, it rides over the pawl until the next slit is reached when its nose will be pushed upward into the slit by its light coil spring 126. The pawl does not remain in this position, for it is again swung downward by the continued movement of the strip due to the length of movement of its carrier as described. Upon the return stroke of the carrier which brings the strip back with it, the nose of the pawl will again enter the slit it has just been forced out of and hold it against further backward movement as illustrated in Fig. 29 while the carrier continues until it reaches its normal position as illustrated in Fig. 5, in which position it remains at rest throughout the remainder of the cycle of operation. Shortly after the aligning pawl arrests the movement of the band strip, the push rod 149 is pushed upward by its cam. This movement of the rod causes the arm 152 to swing the water compartment 140 with its integral moistening and gripping jaw 137 upward, and at the same time the upward movement of the rod swings the lever 148 upward which turns the shaft 138 in a counter-clockwise direction. This action causes the upper gripping jaw 136 to swing downward to meet the moistening and gripping jaw 137 and grip the end of the band strip between them as illustrated in Figs. 1 and 5. The raised front edge 141 of the jaw 137 contacts with the underside of the band strip just slightly beyond the gummed surface with which the moistening wick 139 comes into contact. At the instant when these moistening and gripping jaws have closed upon the band strip, the push rod 128 is caused to rise very quickly; which, by means of the lever 127, the shaft 122 and the lever 120, causes the band cutter 119 to be forced up quickly into the position illustrated in Figs. 1 and 5. This action severs a band 11 from the band strip, the blade of the cutter having been forced upward through the band strip and into the rectangular slot 133 provided in the top plate of the carrier guide 114 which acts as the shearing edge for the cutter blade. The distance between the cutter blade and the nose of the aligning pawl does not change for different lengths of bands. This distance is equal to the standard length of gummed surface required for cigar bands plus a very small clearance between the edges of the gum and the curve of the U-shaped slit 131. When a longer band than that illustrated is to be used, the aligning pawl and cutter, and the moistening and gripping jaws are moved outward or away from the center of the wrapping and banding position, the center line of which is the center of the plunger 12; and for a shorter band, the adjustment is just the opposite. The adjustment for the aligning pawl and cutter is obtained by loosening the screws 116 (see Figs. 1 and 5) and sliding the bracket 115 in the required direction. This adjustment of the bracket also carries with it the carrier guide 114 which is necessary to keep the rectangular slot 133 and the recess 132 (see Fig. 8) provided in it, in perfect alignment with their cooperating parts, the cutter and aligning pawl respectively. The moistening and gripping jaws are adjusted by loosening the screws 144 and sliding the bracket 143 in the required direction. The distance each of the above members are moved toward or away from the center of the wrapping and banding position is equal to one half of the difference in length of the band to be used and that of the band previously used. The change in position of the push rods 128 and 149 when the brackets 115 and 143 respectively are adjusted is compensated for by their respective cams which are not shown in the drawings but which are of the flat wedge type and adjustable to meet the necessary changes.

During the first part of the return stroke of the band strip carrier, and before it has reached the position illustrated in Fig. 29, the wrapper feed mechanism feeds the wrapper 8 into its supports 9 and 10, which are located directly under the wrapping and banding position. Reference is now directed to Figs. 13 to 18 inclusive which fully illustrate this wrapper feed mechanism, and the following is a description of its operation.

The wrapper strip 8ᵃ is supplied to the mechanism from the roll 8ᵇ which is supported in the brackets 154. The end of the strip is fed into the former 156 until its edge is in line with the edge of the reinforcing yoke 174 located at the left hand side of the former which is most clearly shown in Figs. 13 and 14. With the wrapper strip in this position, the shuttle 165 is moved toward the right until its yoke 173 contacts with the yoke 174. The strip is then fed into the wrapper shuttle by the feed roller 155 in synchronous timing with the forward feed of the band strip when the machine starts operating. When the end of the wrapper strip has entered the shuttle, the shuttle moves back to its normal position as the wrapper continues to move forward. The feed roller is revolved by an intermittent drive which is adjustable to vary the length of wrapper strip fed into the shuttle. When the wrapper strip comes to rest in the shuttle, the lever 177 is pulled downward and the circular cutter 176, which is being rotated at a very high speed, cuts through the wrapper strip as it passes between the reinforcing yoke 173 of the shuttle and the yoke 174 of the former, as illustrated in Fig. 17. This cutting action leaves the equivalent of a wrapper 8 in the shuttle which is then moved toward the wrapper supports 9 and 10 as illustrated in Fig. 18. This sliding action of the shuttle is obtained by the pulling down of the rod 171 which is connected to the gear sector 168. The turning of the gear sector pushes the gear rack 167 forward which is secured to the bottom of slide plate 166 of the shuttle. The length of the movement of the shuttle is of such length to bring it into close contact with the ends of the wrapper supports 9 and 10. While the shuttle dwells in this position, the rocker arm 198 is actuated by its cam. This causes the wrapper pusher 197 to be forced downward against its coil spring until its rounded head is on a line with the bottom surface of the rail 202 which is clearly illustrated by dot and dash lines in Fig. 18. This brings the lower end of the wrapper pusher in line with the end of the wrapper 8, at which time, the levers 190 are swung counter-clockwise by their actuating mechanism. This action slides the wrapper pusher block 188 forward due to its being linked to said levers 190 by means of the arms 189 integral with said block and the connecting links 191. When the pusher block is moved forward, the pusher 197 is retained in its depressed position due to its rounded end sliding from under the rocker arm 198 to the underside of the rail 202, and, as the pusher is carried forward, it contacts with the edge of the wrapper carrying it forward with it, until it reaches the position illustrated in Fig. 18. This action places the wrapper in its supports 9 and 10 directly under the wrapping and banding position, and under the band as illustrated in Fig. 1. In moving the wrapper forward the lower end of the pusher passes through the slot or space 172 provided for this purpose between the top edges of the body portions of the shuttle which is most clearly illustrated in Fig. 16. When the wrapper has been deposited in its supports 9 and 10, the pusher remains idle until the shuttle has been returned to its normal position by the gear sector 168 and its cooperating rack. This is done to insure against any movement of the wrapper due to friction between its surface and the shuttle. When the pusher is returned to its normal position, the rounded end passes from under the rail 202 and the pusher is forced upward by its coil spring as illustrated in Fig. 18 to clear the passage for the next wrapper.

Having thus described that portion of the cycle of operation pertaining to the feeding of the bands and wrappers, I will now describe the remainder of the cycle pertaining to the wrapping and banding of the cigars, and their ejection from the wrapping and banding position.

As the cycle of operation continues with the band, wrapper and cigar in place as illustrated in Fig. 1, the plunger 5 moves the cigar upward, and as the upper left-hand edge of it touches the rounded corner formed by the centering plate 4 and its flange 7, this centering plate 4 is pushed toward the left. This movement causes the centering plate 3 to move toward the right an equal distance due to their being connected by a parallel movement mechanism. As the plate 3 moves away, the cigar slides toward it due to the pressure exerted against the plate 4, and this action continues until the distance between the two plates is equal to the width of the cigar. This action absolutely centers the cigars and automatically takes care of any variation. As the plunger 5 continues to move upward, it pushes the top surface of the cigar into contact with the wrapper 8, the band 9 and the presser plunger feet 12ᵃ and 12ᵇ as illustrated in Fig. 19; at the same time the moistening and gripping jaws 136 and 137 open up and release the gummed end of the band, and the band cutter 119 returns to its normal position. The continued movement of the plunger 5 causes the cigar to force the presser plunger upward against the tension of the coil springs 18 as illustrated in Fig. 20. This action causes the wrapper to be firmly gripped between the presser plunger feet and the top of the cigar, and the band to be firmly gripped by the rough surface of the fabric tapes 74 and 74ª secured in the bottom of the presser plunger foot 12ª, to prevent its slipping on the smooth surface of the wrapper. Thus the wrapper and band will be held in perfect alignment on the cigar as the continued upward movement of the plunger 5 pushes them into the wrapping and banding position illustrated in Fig. 21. During this movement the wrapper and band have been folded around three surfaces of the cigar as shown, the side plates 20 and 48 having forced them downward tightly against the sides of the cigar, with the edges of the wrapper having been pulled out of the supports 9 and 10 and resting against the beveled tops of the centering plates 3 and 4, and the ends of the band extending into the slots 218 and 219 of the plates 3 and 4 respectively as illustrated in Figs. 21 and 22. It will also be noted that the fabric tapes 74 and 74ª have also been forced upward with the cigar, wrapper and band, thus insuring against any possibility of the band slipping, and the extra amount of each tape required for this part of the operation was drawn around the rollers 70, 71, and 76, against the tension of their coil springs 73 and 73ª which are provided partly for this purpose and to keep the tapes taut during all stages of the operation.

Referring again to Fig. 21 it will be seen that the rocker arm 56 has been swung slightly in a clockwise direction and due to this movement, the spring 62 secured to its upper end 64, (see Fig. 1) has pressed against the plunger retaining pin 63, which in turn is forced against the plunger plate 12 to hold the presser plunger in position against the pull of its coil springs 18 when the plunger 5 moves downward prior to the action of folder plates 87 and 96 as illustrated in Fig. 23.

This holding of the presser plunger in position does not prevent the cigar with its wrapper and band from being dislodged, but merely helps by eliminating the pull of the springs 18, the actual gripping of the cigar, wrapper and its band being performed by the side plates 20 and 48. They are moved toward one another, thereby creating a slight squeezing action against the sides of the cigar to overcome the pull of the coil springs 73 and 73ª on the tapes 74 and 74ª respectively. This squeezing action is applied by a slight counter-clockwise turning of their toggle levers 28. It might be well to mentioned at this time that the space between the side plates 20 and 48 is automatically adjusted to take care of various widths of cigars, and this adjustment is made when the cooperating band feed is adjusted to accommodate the length of the band to be used. This adjustment is transferred to the toggle levers 28 by a mechanical connection from the band feed actuating mechanism at the main drive, which is not shown, to the toggle push rod 33. If a long band is to be used, the push rod 33 will be pulled downward which will spread the plates 20 and 48 further apart, and if a short band is to be used, the push rod will be moved upward which would bring the plates closer together. In addition to this adjustment at the band feed, there is also a cam action which will always force the push rod upward to create the squeeze action between the plates at the proper time during the cycle of operation.

Referring now to Fig. 23 it will be seen that the plunger 5 has started on its downward course and the folder plates 87 and 96 have moved toward one another. These plates do not move simultaneously. Their movements are as follows, considering them to be in their normal positions as illustrated in Fig. 21. When the plunger 5 starts to move downward, the folder plate 87 starts to move inward and its beveled edge folds the edge of the wrapper under the cigar, and the downwardly extending end of the band 11 passes into the opening 88, leaving it undisturbed as illustrated in Fig. 23. At the completion of this movement, the folder plate 96 starts to move inward and folds the other edge of the wrapper under the cigar, the other downwardly extending end of the band being left undisturbed by its entering the opening 97. When the folder plate 96 has reached the position illustrated in Fig. 22, the folder 87 starts to recede as the folder 96 continues to proceed until both folders take the position illustrated in Fig. 24 which completes the folding of the wrapper around the cigar. During this folding operation, the bottom end folders 205 have moved up to the position illustrated in Fig. 25.

At this point in the cycle of operation, with the folders in the position illustrated in Fig. 24, the rocker arm 56 is moved in a counter-clockwise direction until it has reached the position illustrated in Fig. 26. This movement of the rocker arm releases the presser plunger 12, but the downward pull of its springs 18 cannot dislodge the partly wrapped and banded cigar because the side plates 20 and 48 are still squeezing against it, and they in turn are aided in retaining the cigar in position by the folder 96 which has passed underneath it. The movement of the rocker arm has moved the band folder finger 67 forward. This movement causes the roller 70 to press the fabric tape 74 against the end of the band, forcing it upward tightly against the already folded wrapper, said upward pressure of the roller being obtained from the flat spring 68 which presses against the tongue 69. When the finger has reached the limit of its movement as illustrated in Fig. 26, it immediately starts to recede with the folder plate 96 following it until the parts take the position illustrated in Fig. 27, the folder plate 87 having moved backward beyond its normal position to accommodate the folder 96. During the forward movement of the folder plate 96, the beveled edge 220 which forms the rear of the opening 97, came into contact with the band and forced it tightly upward against its other end which was placed in position by the finger 67. This last folded end of the band is the gummed end which was moistened by the moistening jaw 137, and the pressure of the folder plate 96 securely seals the two ends of the band together. Referring again to Fig. 26, it will be seen that band strip carrier 109 has started to move forward when the band folder finger 67 has already reached the limit of its forward movement, but its movement is very slow until the folder plate 96 has practically reached the position illustrated in Fig. 27 when it speeds up. While this banding operation was taking place, the plunger 5 moved down to its normal position as shown in Fig. 27 and the ejector finger 210, shown in dot and dash lines, has been moved forward and down upon the top of the wrapped and banded cigar, and the band strip carrier has attained its full forward movement. During this operation, the end folders 204 and 205 at each end of the cigar have been brought together as illustrated in Fig. 28. These folders press simultaneously against the top and bottom surfaces of the extending ends of the folded wrapper, and as they continue to move toward one another, bringing these surfaces with them, the side surfaces collapse inwardly because the side plates 20 and 48 prevent them from going outward. This makes what is known as a bellows fold which is tightly squeezed together by the beveled edges of these end folders, the beads and grooves of which pinch and score the wrapper. This pinching and scoring causes the folded end to spring inward toward the cigar as illustrated in Fig. 30 when the folders release them.

Referring to Fig. 29 it will be seen that the presser plunger 12 and the side plate 48 have been raised, another wrapper has been fed into position, the band strip carrier is on its return stroke with the aligning pawl 125 retaining the band strip in position and another cigar has been moved into position over the plunger 5. The presser plunger 12 and side plate have been raised to allow the ejector finger 210 and the folder plate 96 to carry the wrapper and banded cigar with them when they return to their normal positions as illustrated in Fig. 1. The presser plunger has been raised by the upward movement of the slotted link 81 engaging the pin 79 of the bracket 78 attached to the plunger, said link being actuated by the lever 82 and the push rod 33. The side plate 48 has been raised by the upward movement of the lever 46.

When the completely wrapped and banded cigars move into the ejected position illustrated in Fig. 1, the reciprocating members 212 are in a raised position. They are then lowered and pulled toward the right, the prongs 213 gripping behind the cigars move them along until the last ejected cigar reaches the position of the previously ejected cigar. During the ejection of the wrapped and banded cigar the folder plate 87 has moved up to its normal position and when the cigar has cleared the plunger 12 and the side plate 48, they move down to their normal positions and all the elements have again attained the positions as illustrated in Fig. 1.

In accordance with the provisions of the patent statute, I have described my invention, but I desire it understood that it is not confined to the particular form illustrated and described, the same being merely illustrative, and that the invention can be carried out in other ways without departing from the spirit of my invention, and therefore, I claim broadly the right to employ all equivalent instrumentalities coming within the scope of the appended claims, and by means of which, objects of my invention are attained and new results accomplished; as it is obvious that the particular embodiments herein shown and described are only some of many that can be employed to attain these objects and accomplish these results.

In this specification where I have described the moistening wick 139, it is to be understood that the same is not to be so limited, as this moistening wick is utilized when a continuous strip or roll of gummed bands is used, and that in the event that I use a continuous strip or roll of ungummed bands, then in place of the moistening wick 139, I utilize an adhesive which will apply gum or an adhesive to one end of the band so that the same can be securely wrapped around the cigar.

Having now described my invention, what I claim, and desire to secure by Letters Patent, is:

1. A cigar machine for wrapping and banding a cigar with resilient wrapping material at a single station without intermediate transportation comprising means of supporting a continuous strip of resilient wrapping material, means to sever the wrapping material, means of supporting a continuous strip of gummed cigar bands, means to automatically feed said severed portion of the strip of wrapping material to a wrapping position, means to automatically feed said strip of bands to a banding position, automatic means for delivering a cigar to the wrapping and banding station, independent means to sever a band from the strip of bands, means to apply the severed wrapping material and band around the cigar, means to fold and score the ends of the wrapper by a double crimp to cause the ends to spring inward toward the cigar, and automatic means for discharging the cigar after it has been wrapped and banded in the same order and edgewise disposition.

2. A cigar machine for wrapping and banding a cigar with resilient wrapping material at a single station without intermediate transportation comprising means of supporting a continuous strip of resilient wrapping material, means to sever the wrapping material, means of supporting a continuous strip of gummed cigar bands, means to automatically feed said severed portion of the strip of wrapping material to a wrapping position, means to automatically feed said strip of bands to a banding position, automatic means for delivering a cigar to the wrapping and banding station, independent means to sever a band from the strip of bands, means to hold the severed band in alignment, means to apply the severed wrapping material and band around the cigar, means to fold and score the ends of the wrapper by a double crimp, and automatic means for discharging the cigar after it has been wrapped and banded in the same order and edgewise disposition.

3. A cigar machine for wrapping, banding and sealing a cigar with resilient wrapping material at a single station without intermediate transportation, said machine comprising means for supplying a continuous strip of resilient wrapping material, means to sever the wrapping material in suitable portions, means to hold the severed portions of the wrapping material in alignment, separate means for supplying a continuous strip of gummed cigar bands, means to automatically feed said severed portion of the wrapping material to a wrapping station, means to automatically feed said strip of bands to the same station, automatic means for delivering a cigar in its original edgewise disposition and with the same side up to said wrapping and banding station, independent means to sever a band from the strip of bands, means to hold the severed band in alignment, moistening means adapted to moisten the gummed end of the severed band, means to apply the severed wrapping material around the cigar and paste the band over said wrapping portion, means to score and fold with a double crimp the ends of the wrapper at the same station, and automatic means for discharging the cigar after it has been wrapped and banded at the aforesaid single station in the original order and with the same side up.

4. A cigar machine, adapted to wrap and band a cigar with resilient wrapping material at a single station, comprising means for supplying a continuous strip of resilient wrapping material, means for severing the wrapping material, means for supplying a continuous strip of gummed cigar bands, means for automatically feeding said severed portion of the strip of wrapping material to a wrapping position, means for automatically feeding said strip of bands to a banding position, superimposed to the wrapping position, automatic means for delivering a cigar to the wrapping and banding positions in a rectilinear line with the cigars always keeping the same side up, independent means to sever a band from the strip of bands, means for applying the severed wrapper and band to a cigar, and automatic means for discharging the wrapped and banded cigar in the same original order and with the same side up.

5. In a cigar machine of the character described, comprising means of supplying a continuous strip of cigar bands, a frictional primary reciprocating feeder, adapted to automatically feed said strip of bands intermittently in appropriate lengths toward a banding position, means to hold the strip in alignment, an adjustable secondary element, stationary during operation and adapted to check the transport of the bands at exact predetermined lengths, adjustable means to sever the bands at such predetermined lengths from the continuous strip and means to secure one of said severed bands around a cigar while the latter is held stationary.

6. In a cigar machine of the character described, the combination with a banding mechanism, comprising means for supplying a continuous strip of cigar bands provided with small perforations, means to automatically feed said strip to a banding position and means to sever said bands in predetermined length from the continuous strip; of means to hold said severed portion in alignment, said means comprising an adjustable gripping element adapted to travel reciprocatingly in the feeding direction of the band strip and to grip said severed band portion by entering said perforation in the band.

7. A cigar wrapping and banding machine of the character described, comprising a wrapping material supply means, means to support and to feed a continuous roll of bands, means to intermittently sever a predetermined length from said roll, means to simultaneously apply a wrapper and a severed length from the band roll to a cigar, means to elevate and to fixedly hold said cigar and the band in a stationary position and a coordinate mechanism for separately folding said wrapper and said band around the cigar, while the latter is held stationary throughout this operation.

8. A wrapping machine, adapted to apply a wrapper of resilient wrapping material fixedly and securely around an oblong and brittle article at a single station, comprising a supply means of resilient wrapping material, means to sever a predetermined length of said wrapping material, means to apply said length over the brittle article, covering more than its entire length, means to elevate and to fixedly hold said article with the depending longitudinal wrapper edges in a stationary position and a coordinate mechanism for folding the wrapper around the underside of the article and to securely crimp and fold the overhanging ends of the wrapper to the underside of the article while it is held stationary throughout this operation, thus guarding against unfolding of the longitudinal resilient wrapper edges and against damage to the brittle article by transportation.

9. A wrapping and banding machine, adapted to apply a wrapper of resilient wrapping material and a separate comparatively narrow gummed band around an oblong and brittle article at a single station, comprising a supply means of resilient wrapping material, means to feed a continuous roll of bands, separate means to intermittently sever a predetermined length of said wrapping material and of said band roll respectively, means to moisten the gummed end of the band, means to apply said lengths simultaneously over the brittle article, covering more than its entire length and with the band lying crosswise and uppermost, means to elevate and to fixedly hold said article with the depending longitudinal wrapper edges and the band ends in a stationary position, and a coordinate mechanism for folding the wrapper and the band separately and consecutively around the underside of the article, the band forming a sealed girdle around the medial zone of the article and synchronized cooperative means to simultaneously fold the overhanging ends of the wrapper against the underside of the article while the latter is held stationary throughout these folding and band sealing operations, thus guarding against spontaneous unfolding of the resilient wrapper and against damage to the brittle article by transportation.

10. A wrapping and banding machine, adapted to apply a wrapper of resilient wrapping material and a separate cigar band, gummed at one end, around a cigar, at a single station, comprising a supply means of resilient wrapping material, means to feed a continuous roll of cigar bands, separate means to intermittently sever a predetermined length of said wrapping material and of said band roll respectively, means to moisten the gummed end of the band, means to apply said lengths simultaneously over a cigar, covering more than its entire length and with the band lying crosswise and uppermost, means to elevate and to fixedly hold said cigar with the depending longitudinal wrapper edges and the band ends in a stationary position, and a coordinate mechanism for folding the wrapper and the band separately and consecutively around the underside of the cigar, the band forming a sealed girdle around the medial zone of the cigar and synchronized cooperative means to simultaneously fold the overhanging ends of the wrapper against the underside of the cigar, while the latter is held stationary throughout these folding and band sealing operations, thus guarding against spontaneous unfolding of the resilient wrapper and against damage to the cigar by transportation.

11. A cigar machine, adapted to complete wrapping and banding a cigar at a single station, comprising means for supporting a roll of wrapping material, means for supporting a roll of bands, separate means to sever a predetermined length of said wrapper and of said band roll respectively, automatic means for delivering a cigar in the original order and with the same side up to said wrapping and banding station and means conjointly synchronized for cooperative action to apply a wrapper and a band separately and consecutively to the cigar at the same station and to discharge said cigar wrapped and banded, in the original order and with the same side up.

FRANCIS X. MALOCSAY.